United States Patent Office 3,106,804
Patented Oct. 15, 1963

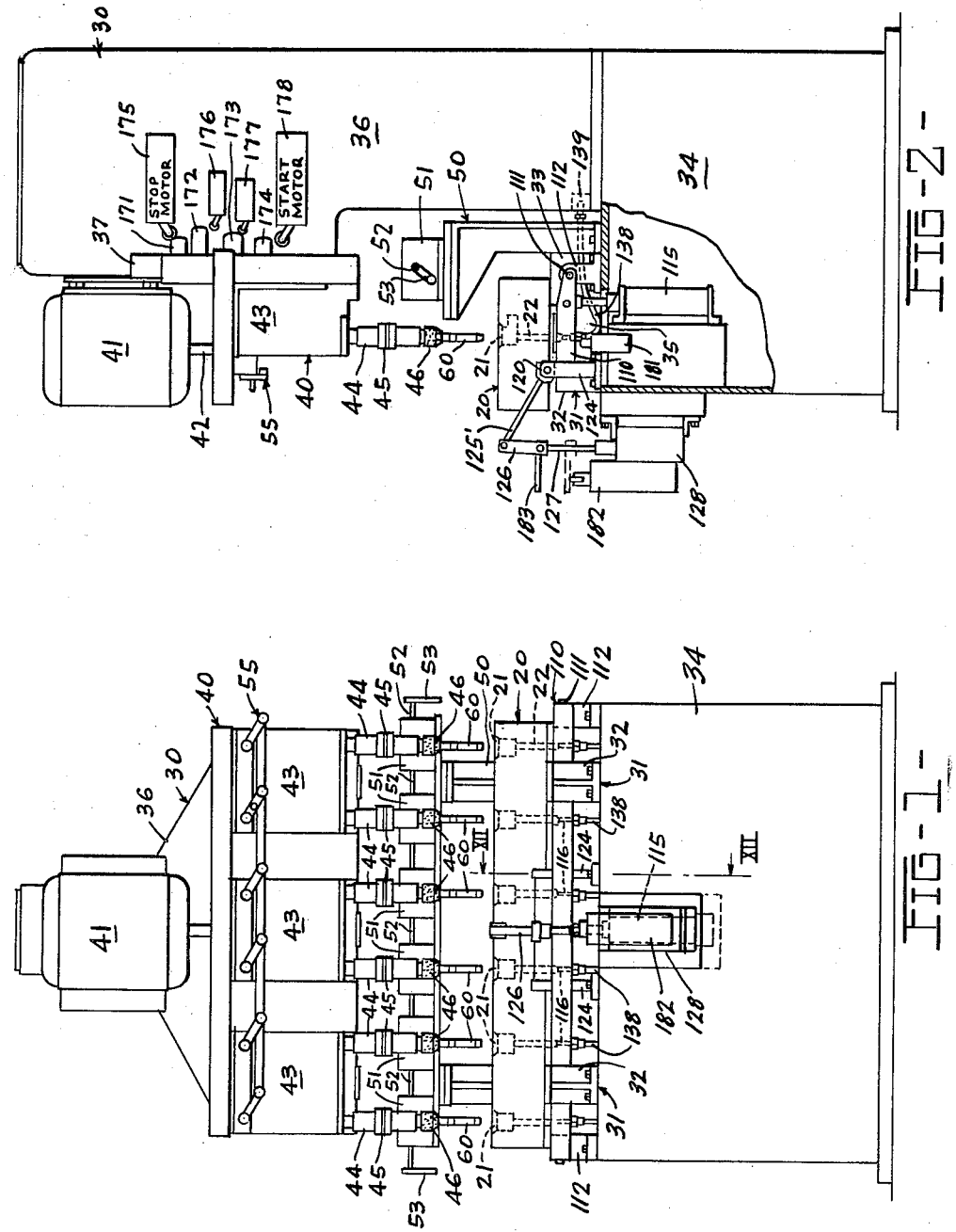

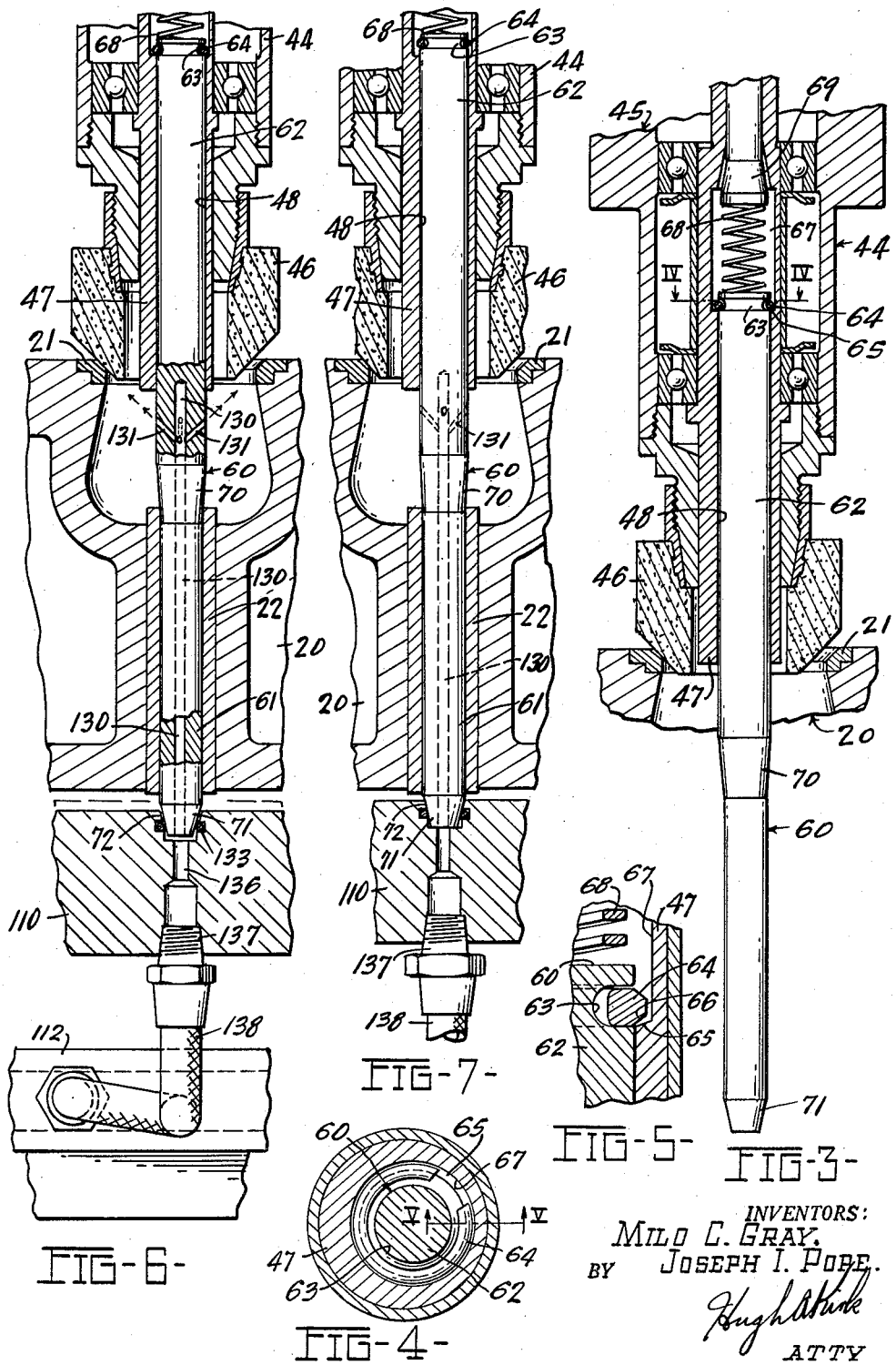

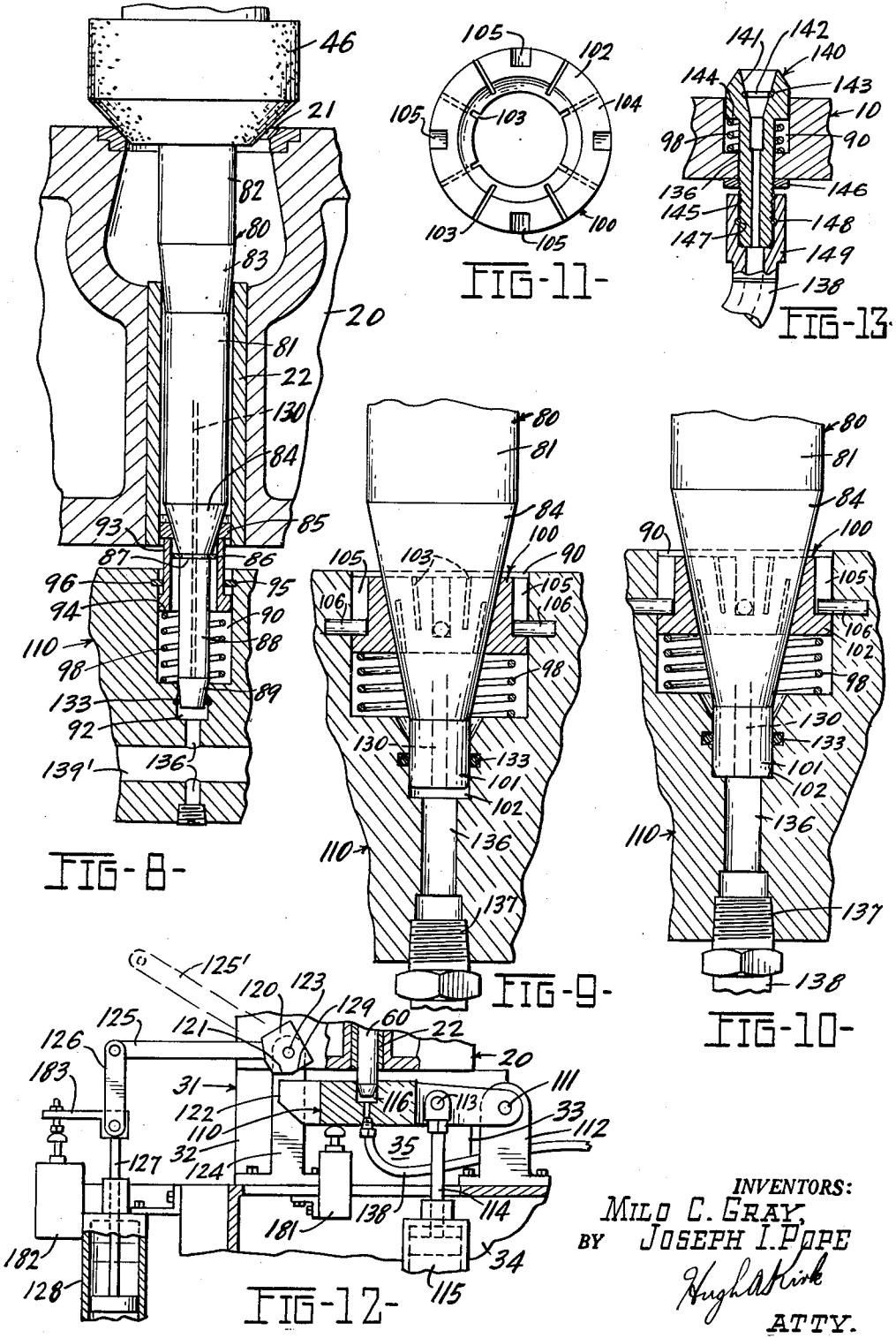

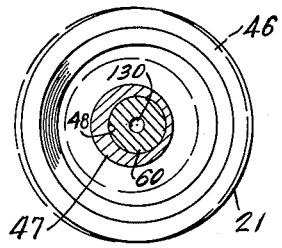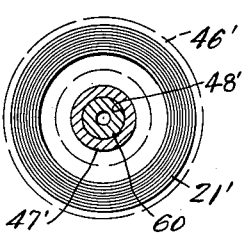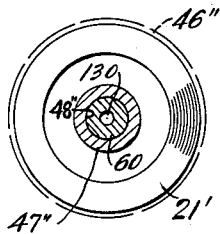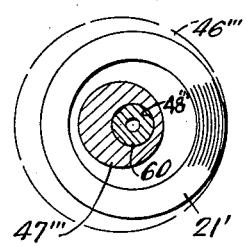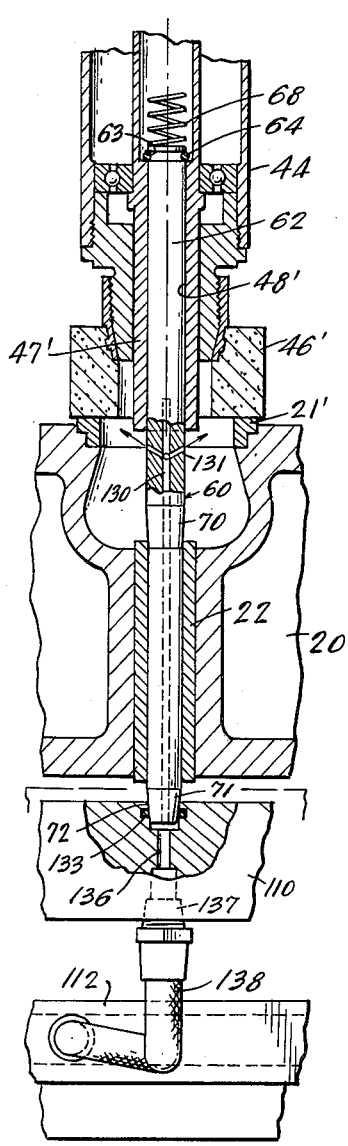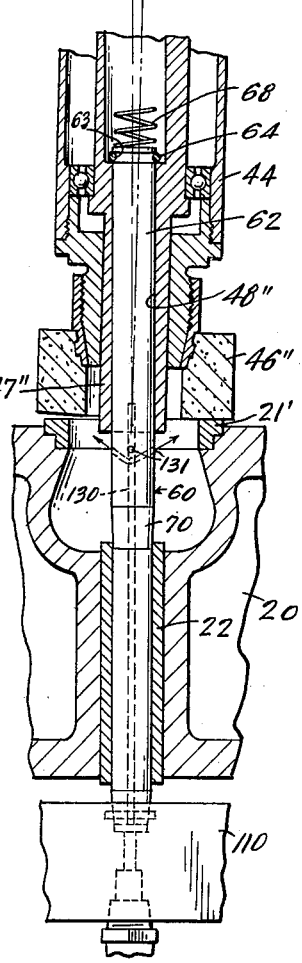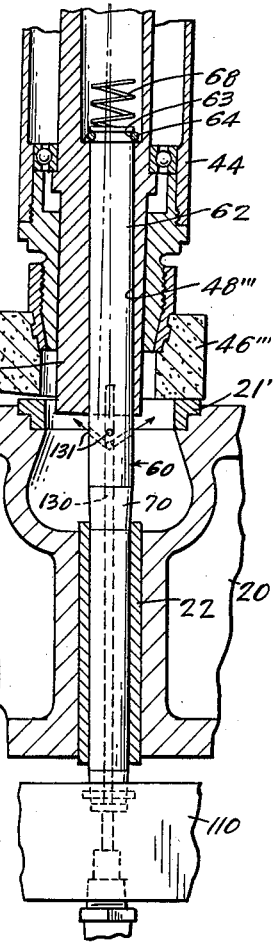

3,106,804
MACHINE TOOL AND PILOT THEREFOR
Milo C. Gray and Joseph I. Pope, Toledo, Ohio, assignors to Hall-Toledo, Inc., Toledo, Ohio, a corporation of Ohio
Filed Aug. 17, 1960, Ser. No. 50,122
20 Claims. (Cl. 51—90)

This invention relates to a machine having a rotating tool and a pilot therefor which pilot is removably attached to the work to be machined. More particularly, it deals with a machine tool for machining and/or grinding valve seats in engine cylinder blocks or heads which have valve stem guides into which the pilot for the tool may be removably wedged and/or clamped. This pilot also may contain a duct for applying a fluid lubricant and/or coolant directly onto the surface of the valve seat being machined by the tool while the tool rotates around the pilot as it is fed axially along the pilot.

Previously the pilots employed in such machines had to either be set by hand into the valve guides of the cylinder heads to be machined, or if they were placed therein by the machine itself, they were often difficult to remove by the machine because of their wedging action in the valve guide. Furthermore in applying a lubricant or coolant to the surface being machined it was often difficult to be sure that the complete surface was being contacted with the coolant unless the whole piece were immersed or substantially flooded with liquid.

Accordingly it is an object of this invention to produce a simple, efficient, effective and economical cutting, grinding or boring machine having a tool spindle into which a replaceable pilot may be inserted for guiding the tool spindle relative to the work to be machined.

Another object is to provide a simple, efficient, effective, economical pilot for such a tool spindle which pilot may be inserted and retracted and carried by the tool spindle in such a machine, which pilot will not jam, and which pilot also may include fluid ducts and connections for a lubricant and/or coolant to be directed onto the surface of the work being machined.

Another object is to provide such a machine with a specific means for releasing the pilot carried by the spindle before the spindle is retracted after its machining operation is completed.

Another object is to provide such a machine with a plurality of spindles and pilots carried in each spindle, and means for releasing simultaneously all of said pilots from the work after the machining operation thereon has been completed.

Another object is to provide in such a multi-spindle machine having duct containing pilots, a combination duct manifold and simultaneous pilot duct connection means with the simultaneous pilot releasing device, which also may include automatic means for starting and cutting off the fluid supplied to the manifold duct and to the pilots before and after the machining operation, respectively.

Generally speaking this invention comprises, in a multi-spindle type cutting, grinding or boring machine, having separate easily replaceable centrally located pilots for each spindle which are inserted and wedged into the piece of work to be machined, such as into the valve guides for simultaneously grinding the valve seat in the cylinder head or block of an internal combustion engine, special thrust means for simultaneously releasing all of the pilots from the work piece after the machining has been completed, so the pilots may be easily retracted with the spindles from the work. This releasing means may be manually, hydraulically or mechanically operated, and may be controlled automatically with the operations of the machine.

Each of these pilots comprises a spindle or tool guiding portion and a work piece engaging or anchoring portion. The tool guiding portion may include means, such as a special resilient snap ring for normally maintaining each pilot within a hollow shaft in each spindle, which hollow shaft may include a shoulder against which said snap ring rests and a resilient means such as spring to normally maintain said snap ring against said shoulder. The anchoring portion of each pilot includes at least one frusto-conical section for wedging in at least one end of the valve guide or work piece, and also may include a second frusto-conical portion which may cooperate with a flexible wedging ring or split collet at the opposite end of the valve guide for further anchoring the pilot in the valve guide work piece. The pilot also may include a duct therein and means at one end for releasably attaching a fluid conduit to said duct so that a fluid coolant and/or lubricant may be passed through the pilot to a plurality of outwardly extending holes directed toward the valve seat or surface on the work being machined around the pilot. In a machine comprising a plurality of such ducted pilots, a manifold duct connection may be included in combination with the means for simultaneously releasing the pilots, and the fluid in said ducts may be automatically turned on and shut off with the operations of the machine.

The above mentioned and other features and objects of this invention and the manner of attaining them will become more apparent and the invention itself will be understood best by reference to the following description of embodiments of the invention taken in conjunction with the accompanying drawings, wherein:

FIG. 1 is a schematic front elevation of one embodiment of a multiple spindle grinding machine for the valve seats in an engine block showing the pilots for the grinders carried by the spindles and the release mechanism and coolant fluid supply manifold mounted under the engine block being machined;

FIG. 2 is an end elevation of the machine shown in FIG. 1 showing some of the operation control switches and hydraulic pistons for operating the pilot release mechanism;

FIG. 3 is an enlarged vertical section of one of the grinding spindles disclosed in the machine of FIG. 1 showing a releasable pilot carried in the central hollow shaft thereof;

FIG. 4 is a section taken along the line of IV—IV of FIG. 3 showing the snap ring for retaining the pilot in the hollow shaft of the spindle;

FIG. 5 is an enlarged section of one side of the snap ring shown in FIG. 3, or a section taken along line V—V of FIG. 4 to show the cross-sectional configuration of the snap ring;

FIG. 6 is a vertical section similar to that shown in FIG. 3 with the tool and pilot in valve seat grinding position and ducts in the pilot for directing a fluid lubricant and/or coolant directly onto the surface of the valve seat being ground by the tool;

FIG. 7 is a view similar to FIG. 6 showing the pilot release mechanism moved upwardly into its pilot releasing position;

FIG. 8 is a vertical section similar to FIGS. 6 and 7 of another type of pilot according to this invention including a spilt collet at its lower end for wedgingly engaging the lower end also of the pilot in a valve guide, and means associated with the release mechanism for engaging the collet;

FIG. 9 is a further enlarged sectional view of another type of end collet in pilot clamping or wedging position at the lower end of a pilot similar to that shown in FIG. 8, in which the collet is retained in the releasing mechanism;

FIG. 10 is a sectional view similar to FIG. 9 showing the releasing device in collet and pilot releasing position;

FIG. 11 is a plan view of the type of collet shown in FIGS. 9 and 10;

FIG. 12 is an enlarged vertical sectional view taken along line XII—XII of FIG. 1 showing the pilot releasing mechanism away from its pilot releasing position as shown in full lines in FIG. 2;

FIG. 13 is an enlarged longitudinal sectional view of a modified and resilient form of pilot end engaging connection for a fluid duct, which may be used instead of the fluid end pilot connectors shown in FIGS. 6 and 7;

FIGS. 14, 15 and 16 are vertical sections similar to that of FIG. 6 with parts broken away, showing, respectively, a concentric, an angular concentric, and an angular eccentric, grinding tool in grinding position on a valve seat guided by a pilot as that shown in FIG. 6; and FIGS. 17, 18, 19 and 20 are horizontal sectional views looking down the valve seats being ground by the differently guided grinding tools shown respectively in FIGS. 6, 14, 15 and 16.

I. Multiple Spindle Machine

Referring now specifically to FIGS. 1 and 2, for the purpose of illustration, this invention is shown to be embodied in a multiple spindle automatic machine for simultaneously grinding six valve seats in the head 20 of an internal combustion engine, in which each of the valve seats 21 is provided with a central valve guide 22 axially aligned and spaced therefrom. As shown in more detail in FIGS. 6, 7 and 8, the valve guides 22 may comprise sleeves and the valve seats 21 may comprise rings which are inserted in the cylinder head casting or block 20.

The work or piece to be machined is mounted in the multiple spindle machine 30, preferably in a suitable jig 31, which may comprise a plurality of work-piece supporting members 32 and 33 anchored to the top of the base section 34 of the machine 30, which supports 32 and 33 have a space or channel 35 between them (see FIGS. 2 and 12) in which space below the work piece 20 the pilot release mechanism 110 to be described later may operate.

Adjacent to the jig 31 mounted on the top of the base section 34 there may be mounted an upright spindle and tool supporting and feeding section 36, the upper end of which may overhang the jig 31 and work 20 and may support on vertical slideways 37 a saddle 40 on which is mounted a tool driving motor 41 having a shaft 42 connected to trains of gears mounted in boxes 43 from each of which depends two rotating spindles 44. Each of these spindles 44 may carry an Oldham type universal joint 45, such as that disclosed and described in Hall et al. U.S. Patent No. 2,338,509 issued January 4, 1944, to permit automatic centering of the cutting or grinding tools on the lower ends of the spindles 44, in the event the valve guides 22 and seats 21 for any two cylinders or heads 20 may be slightly out of line with respect to each other and the spindles. This Oldham type joint permits both slight angular and lateral displacements to compensate for any such minor misalignments and irregularities. At the lower end of each spindle, the tool shown is a grinding wheel 46, which in FIGS. 3, 4, 6, 7 and 8 is shown to rotate around a hollow shaft 47, the hole 48 in which may be eccentric to the rotating axis of the grinding wheel 46. This hollow shaft 47 may be rotated at a different and preferably slower speed than that of the tool or wheel 46 to give a planetary motion thereto, so that the wheel will at any one instance only grind one part of the surface of the seat 21, as is shown in FIGS. 3, 6, 7 and 8.

Also mounted on the top of the base portion 34 of the machine 30 between the jig 31 and upper portion 36 may be a pedestal 50 to support a plurality of grinding wheel dressing tools 51 which may be ganged together by a shaft 52 and simultaneously operated by a lever 53 at the ends of the shaft 52 on opposite sides of the machine 30. Since the grinding wheels 46 may have an eccentric motion as previously described, there is provided a gang lever mechanism 55 connected with the gear boxes 43 for locking each of the eccentric shafts 47 in the same position during the dressing operation.

There may also be provided cams and limit switches between the vertically movable saddle 40 and the upper section 36, and a pilot release mechanism 110 beneath the work piece 20 in the jig 31, however, the details of these parts of the machine and their function will be described later after the description of the different types of pilots which may be used for guiding the rotating tools 46 on the spindles 44 of the machine.

It is to be clearly understood, however, that the grinding wheels 46 may be replaced by other types of cutting tools such as boring, machining, milling, etc., type tools and these tools need not necessarily be driven eccentrically as those disclosed herein, but may be concentrically or angular concentrically or angular eccentrically driven around hollow shafts 47', 47" and 47"' in FIGS. 14, 15 and 16, respectively, in the same manner as the grinding tool 46 around shaft 47 in FIG. 6. These shafts 47', 47" and 47"' have, respectively, a concentric hole 48', a concentric angular hole 48", and an eccentric angular hole 48"' therein, for receiving the guiding end 62 of the pilot 60. FIGS. 17, 18, 19 and 20 which show plan views of the valve seats shown in FIGS. 6, 14, 15 and 16, respectively, also show arcuate lines on these seats of the areas of contact of these eccentric, concentric, angular concentric and angular eccentric types of grinding tools, respectively. Since these other types of guided motions are primarily employed for grinding flat surface valves as 21' as shown in FIGS. 14, 15 and 16, the grinding surfaces of their respective grinding wheels 46', 46" and 46"' are made to correspond with the angles of contact with said surfaces. These other types of angular guiding grinding wheels are specifically shown in FIGS. 10 and 5, respectively of Hall et al. U.S. Patent Nos. 2,338,509 and 2,338,763 issued respectively on January 4 and January 11, 1944.

II. The Pilots

In the specific embodiment described herein each one of the spindles 44 has inserted in the hole or aperture 48 of the hollow shaft 47 a removable pilot 60, shown in greater detail in FIG. 3. This pilot comprises essentially a valve guide anchoring or engaging portion 61 which extends completely through the valve guide 22 as shown in FIGS. 6 and 7 to beyond the lower end thereof to engage a release mechanism 110 as will be described in Section III below, and a tool guiding portion 62 the upper end of which may be provided with a groove 63 into which may be snapped a resilient C-shaped spring 64 which engages against a shoulder 65 provided therefor inside the hollow shaft 47 in the upper end of the hole 48 therein. The lower surface of the resilient C-shaped snap ring 64 may be provided with a 45° bevel 66 as shown in more detail in FIG. 5 so that a manual quick jerk downwardly, or outwardly of the end of the pilot 60, will remove it from its spindle 44, so it may be replaced readily by another or similar pilot having a different sized anchoring portion 61 to fit a correspondingly different sized valve guide. Further in order to compensate for the different depth distances between the wedging engaging position of the valve guide anchoring portion 62, the pilot 60 may float longitudinally in the hollow shaft 47 by providing the enlarged space 67 in the upper portion thereof for the snap ring 64, but this floating must be restricted by a compression spring 68 inside the enlarged portion 67 pressing against the lower flanged end 69 of a central supporting shaft of the spindle mechanism to insure a good wedging engagement of the pilot portion 61 with the work piece 20.

Intermediate of portions 61 and 62 of the pilot 60, there may be provided a frusto-conical section 70 which has a slight taper that is forced and held wedged into the upper end of the valve guide sleeve 22 by the action of the spring 68 when the spindle is lowered into valve seat grinding position as shown in FIG. 6. In this particular embodiment the spindle anchoring section 61 is made substantially the same outside diameter as the inside diameter of the sleeve 22 so that no lateral movement of the wedged in place and then stationary pilot 60 occurs during the machining operation. The lower end of the portion 61 may also provided with a second frusto-conical end portion 71 for engagement in a similar frusto-conical seat or aperture 72 in the pilot release mechanism 110 to be described later in Section IV.

Referring now to FIG. 8, there is disclosed another type of pilot 80 having a lower anchoring portion 81 and an upper tool guiding portion 82, corresponding respectively to the portions 61 and 62 of the pilot 60, but the lower valve guide sleeve engaging portion 81 in this embodiment need not be so accurately dimensioned to the inside diameter of the sleeve 22, in that both an upper valve guide wedging section, namely frusto-conical portion 83 (corresponding to portion 70 of pilot 60) and a lower valve guide wedging portion are provided for this pilot to ensure its stability. This lower end wedging section here comprises an additional frusto-conical portion 84 around which a cooperating split collet 85 is wedged or forced upwardly against the tapered section 84 to wedge the collet 85 between said section 84 and the lower inner end of the valve guide sleeve 22. This split collet 85 which may be retained on the pilot 80 by means of a resilient snap ring 86 located in a groove 87 at the smaller end of the frusto-conical section 84, so that when the pilot 80 is moved from the work piece, the split collet 85 will be retained by the ring 86 providing a flange on the pilot 80. Extending below the lower frusto-conical or tapered section 84 may be a projecting pin portion 88 of the pilot 80 which may terminate into a further frusto-conical section 89, similar to the section 71 of pilot 60, for engagement with the pilot release mechanism 110 (see Section IV below).

In this particular embodiment of pilot 80, the pilot release mechanism 110 is provided with an aperture 90 aligned with the lower end of the pilot and the valve guide 22 which aperture 90 may have a frusto-conical central hole 92 in its bottom for receiving the end portion 89 of the pilot 80 (similar to aperture 72 in FIGS. 6 and 7 for end 71 of pilot 60). In the aperture 90 a sleeve 93 is provided having an outwardly extending lower flange 94 for retention in the aperture 90 such as by a snap ring 95 fitted in a groove 96 in the walls of the aperture 90 near the upper open end thereof. Below the sleeve 93 there is provided a resilient spring 98 which normally urges the sleeve 93 upwardly to engage and push the collet 85 up into its wedging position shown in FIG. 8 for wedging and anchoring the lower end of the pilot anchoring section 81 against the lower end of the valve guide sleeve 22 when the upper frusto-conical section 83 of the pilot 80 wedges into the top end of the valve guide sleeve 22. Thus the pilot 80 is maintained rigidly in the sleeve 22 during the machining or grinding operation of the wheel 46.

Instead of having the collet at the lower end of a pilot 80 being retained by the pilot 80, another type of collet 100 (see FIGS. 9, 10 and 11) may be provided and retained in the aperture 90 in the pilot release mechanism 110, which collet 100 is urged into wedging position directly by means of the spring 98, thus combining the sleeve 93 of FIG. 8 with a split collet 85. For this collet 100, the lower end of the pilot 80 may have a shorter cylindrical extension 101 which fits into a similarly shaped aperture seat 102 at the bottom of the aperture 90. This split collet 100 is shown to be provided with slits 103 extending radially and partway longitudinally through the collet for permitting contraction thereof when wedged over the frusto-conical section 84 of the pilot 80. The outwardly extending flange 104 on the collet 100, corresponding to the flange 94 on the sleeve 93, may be provided with two diametrically opposite pairs of notches 105 into which pins 106 seat. These pins project inwardly from the walls of the aperture 90 for retaining the collet 100 within the aperture 90. Similarly, the snap ring 95 in the groove 96 shown in FIG. 8 may be replaced by pins 106 as shown in FIGS. 9 and 10 or vice versa. Thus when the pilot 80 is inserted into the position as shown in FIG. 9, the split collet 100 is forced upwardly by the spring 98 to anchor the lower end 84 of the pilot 80 in the pilot release mechanism 110, instead of the lower end of the valve guide sleeve 22.

III. The Pilot Release Mechanism

Referring now back to FIGS. 1 and 2 and also to FIG. 12, there is shown a multi-pilot release mechanism bar or member 110 positioned in the space 35 between the pedestals 32 and 33 of the jig 31, which member 110 extends under all of the valve guides 22 of the cylinder head 20 being machined. This mechanism or member 110 may be pivotally mounted on horizontal pivots 111 supported by brackets 112 mounted on the top of the lower base section 34 of the machine 30. This rockably mounted release bar 110 may be connected by means of a pivot pin 113 to the piston rod 114 extending from a hydraulic cylinder 115, which cylinder may be located longitudinally centrally of the release bar 110 as shown in FIG. 1 and which cylinder normally maintains the bar 110 urged upwardly to maintain engagement with the lower projecting ends of the pilots 60 or 80 which are forced through the valve guides 22 into the corresponding aperture seats 72, 92 or 102 provided in the bar 110.

Further upward movement or positioning of the release mechanism 110 is now restricted by cam 120 having bevelled surface 121 acting against projection 122 from the front side of the release bar 110, which cam may be pivoted at pivot 123 on a bracket 124 anchored to the top of the base section 34. Keyed to the pivot 123 may be a lever arm 125 connected by a pivoted link 126 to the piston rod 127 controlled by a hydraulic cylinder 128. After the milling, machining or grinding operation has been completed, the cylinder 128 may be operated to move the lever 125 up into its dotted line position 125' shown in FIG. 12 positioning the cams so that the extension 122 on the release mechanism 110 is permitted to move upward slightly into its dotted line position against the surface 129, thereby pushing upwardly against the bottom ends of all of the pilots as shown in FIG. 7 and 10 to release their wedged anchoring of their tapered portions 70 and 83 and collets 85 and 100. Once the pilots are thus released the spindles 44 may be raised or retracted by elevating the saddle 40 and the pilots 60 or 80 inserted in their hollow shafts 47 will not be pulled out because of their retaining snap rings 64 against their shoulders 65.

Although the mechanism for this release is shown to be hydraulically operated for the automatic machine 30 disclosed herein, the cam 120 also may be manually operated, and instead of applying a sustained hydraulic pressure by the cylinder 115 under the bar 110, other means may be employed to urge the projection 122 of the release bar 110 against the surfaces 121 and 129 of the cam 120.

IV. Fluid Conducting Pilot

The pilots 60 and 80 also may be provided with a central duct 130 as shown in FIGS. 6 through 10, which duct 130 may extend from the lower end 71, 89 or 101 thereof upwardly through the anchor engaging section 61 or 81 to a plurality, preferably four, of equally circumferentially spaced upwardly and outwardly directed outlets or nozzles 131 as shown in FIGS. 6 and 7 pointed directly toward the surface of the valve seat 21, so that a fluid coolant and/or lubricant may be pumped through the duct 130 and outlets 131 to be applied closely to the grinding surface during the grinding or machining operation, enabling faster and better machining of the seats 21.

The release mechanism 110 also may act as a multiconnector device for the fluid to be conducted through all of the pilots. Accordingly, the seats 72, 92 and 102 in the release bar 110 are preferably also provided with a fluid tight gasket 133 such as a neoprene O-ring, for sealing the lower ends 71, 89 and 101 of the pilots 60 and 80 into the bar 110 provided with vertical ducts 136 which may be enlarged and tapped at their lower ends 137 for screw connection with a fitting on the end of a flexible conduit 138 for each pilot, all of which conduits 138 may be connected to a common manifold 139 shown in FIG. 2. If desired, the manifold connection may be incorporated in the release bar 110 as a longitudinal manifold duct 139' shown in FIG. 8, with the lower end of the duct 136 being closed such as by a plug. Thus liquid or fluid coolant and/or lubricant may be applied under pressure to each of the pilots when the pilots are inserted into their aperture seats 72, 92 and 102 in the release bar 110.

If a sufficiently cushioned connection is not provided by the release bar 110 for the ends of the pilots, there may be provided special duct connectors in apertures 90 and ducts 136 of the release bar 110 as shown in FIG. 13. For the pilot ends 71, these special duct connectors 140 each may comprise a frusto-conical aperture seat 141 in its upper end with a resilient fluid tight sealing ring or gasket 142 mounted in a groove 143 in its conical surface. This connector 140 also may be provided with a shoulder 144 against which the compression spring 98 urges permitting some slight downward movement of the whole connector 140 and maintaining good fluid tight connection with the ducted lower end of the pilot held inserted in its seat 141. Also this connector 141 may be threaded at its lower end 145 for retaining a threaded nut ring 146 to prevent the coupling 140 from being pulled out of the release bar 110 in the event the end 71 of the pilot 60 sticks into the aperture 141. Furthermore the lower end of the threaded extension 145 may be provided with a groove 147 and resilient gasket ring 148 or other means for connecting it with the snap-on type of coupling 149 connected to the end of the conduit 138.

If desired, and a single pilot machine is employed, the snap-on type of coupling 147, 148, and 149 may be provided directly on the end of the pilot 60, provided a pilot release mechanism like mechanism 110' is not required.

V. The Machine Operation

Referring now again to FIGS. 1, 2 and 12, there may be provided a series of cams 171, 172, 173 and 174 mounted on the vertically movable saddle 40 which cooperate respectively with control switches 175, 176, 177 and 178 which control the automatic operation of the device in combination with additional control switches 181 and 182, the latter of which is controlled by an arm 183 mounted on the piston rod 127 that operates the release bar cam 120.

Thus in the automatic operation of the machine after the work piece 20 has been clamped into the jig 31, an electric control cycle button may be pushed which first starts the saddle 40 to descend rapidly until cam 173 operates control switch 177 which may operate a solenoid valve to energize the hydraulic cylinder 115 and raise and maintain the release bar 110 against surface 121 of the cam 120 and connect all the seats 72 (92 or 102) in the bar 110 into fluid tight relationship with the ducted ends 71 (89 or 101) of the pilots 60 (80). The raising of the release bar 110 against the cam surface 121 also operates limit switch 181 to start the fluid lubricant and/or coolant flowing through the manifold and ducts 139, 138, 136 (or 139'), 130 and 131 to be applied to the surface of the valve seat 21 being machined or ground. Next the cam 174 contacts the switch 178 to start the motor 41 indicating that the saddle has now reached the position at which the grinding or cutting operation commences. The saddle 40 may be provided with automatic feed for the grinding wheels 46, so that after the grinding has been completed, the cam 172 on the saddle 40 operates limit switch 176 which is a time delay switch that first operates a solenoid valve to operate the piston 128 to move the cam 120 and lever 125 into its dotted line position 125' shown in FIG. 12, or full line position shown in FIG. 2, thereby permitting the release mechanism 110 to move slightly upwardly and force or thrust the release of all of the pilots 60 (80) from their wedged positions in the work piece 20, before the motor 41 is stopped and the flow of coolant fluid is shut off. This time delay switch then operates a solenoid valve to cause the hydraulic cylinder 128 to retract and depress or move the release bar 110 back into its normal position retraction also causes the lever 183 mounted on the piston 127 to operate the limit switch 182 to initiate the raising of the saddle 40. This raising of the saddle 40 causes cam 171 to operate limit switch 175 and stop the spindle driving motor 41 and re-set the apparatus for its next work cycle. The work piece 20 is then removed and the next piece is inserted and clamped in its place on jig 31, and the start button to repeat the cycle is pushed again. After a predetermined number of cycles, which may vary with the type of work being done, the saddle 40 may then further be retracted at which time the lever 55 is operated to stop the eccentric motion of the spindles 44 so that the grinding wheels 46 may be dressed by the dressers 51. Furthermore automatic resetting means (not shown) may be employed to compensate for the amount of material removed from the wheels 46 during their dressing.

While there is described above the principles of this invention in connection with specific apparatus, it is to be clearly understood that this description is made only by way of example and not as a limitation to the scope of this invention.

What is claimed is:

1. A machine for machining a seat with a longitudinal guide axial of said seat, said machine comprising: a rotating tool mounted on a hollow shaft, a pilot for said tool extending from inside said hollow shaft outwardly beyond said tool, and about which pilot said tool is rotated and axially movable, said pilot having means for snugly and removably fitting into said guide to act as a stationary guide for the movements of said tool, resilient means for urging said pilot into said guide, and contractable means on said pilot between said pilot and said tool to releasably retain said pilot within said hollow shaft of said tool.

2. A machine according to claim 1 wherein said contractable means comprises a snap ring in a groove around the upper end of said pilot and said hollow shaft comprises a shoulder for engagement of said snap ring.

3. A machine according to claim 2 wherein said snap ring has a bevelled surface adjacent said shoulder to aid in the removal of said pilot from said hollow shaft.

4. A machine according to claim 1 wherein said pilot includes a fluid duct means with outlet therefrom directed toward said seat.

5. A machine according to claim 1 including means at the opposite end of said pilot from said hollow shaft for producing an upward thrust on said pilot to release said pilot from said guide.

6. A machine according to claim 5 wherein said pilot fitting means includes a frusto-conical section adjacent said releasing means and a split collet around said frusto-conical means, and means on said releasing means for urging said split collet into engagement with said frusto-conical means.

7. A machine according to claim 6 wherein said pilot includes means for maintaining said collet on said pilot.

8. A machine according to claim 6 wherein said releasing means includes means for retaining said collet.

9. A machine for machining valve seats with a longitudinal valve guide axial of each of said seats, said machine comprising: a rotating tool mounted on a hollow shaft, a pilot for said tool extending from into said hollow shaft to beyond said tool, and about which pilot said tool is rotated and axially movable, said pilot having means for snugly and removably fitting into said valve guide to act as a stationary guide for the movements of said tool, means for connecting and disconnecting a supply of a fluid coolant to the end of said pilot when said pilot is in and out of said guide, respectively, and duct means in said pilot for directing said coolant directly from said pilot toward the said valve seat to be machined.

10. A rod shaped pilot for guiding the axial movement of a rotary tool having a centrally located hollow shaft for said pilot, said hollow shaft having a shoulder therein, and a piece to be worked having a hole for said pilot located centrally of the surface on said piece to be worked, said pilot comprising: a guiding portion for said tool and an anchoring portion for said pilot in said hole located centrally of said surface on said piece to be worked, said anchoring portion having a frusto-conical section for removable wedging engagement in said hole, and means between said pilot and said shaft and engageable with said shoulder to releasably retain said pilot within said hollow shaft.

11. A machine for machining a valve seat with a longitudinal valve guide axial of said seat, said machine comprising a rotating tool mounted on a hollow shaft having a shoulder therein, a pilot for said tool extending from into said hollow shaft to outwardly beyond the end of said tool and about which pilot said tool is rotated and axially movable, means on said pilot engageable with said shoulder for normally retaining said pilot in said hollow shaft of said tool, said pilot having means for snugly and removably fitting into said valve guide to act as a stationary guide for the movements of said tool, and resilient means between said pilot and said tool to normally maintain said engageable means against said shoulder and to urge said valve guide fitting means on said pilot into said valve guide.

12. A machine according to claim 11 wherein said shoulder engageable means on said pilot comprises a contractable snap ring in a groove around the upper end of said pilot for removal of said pilot from said hollow shaft.

13. A machine for machining a seat with a longitudinal guide axial of said seat, said machine comprising: a rotating tool mounted on a hollow shaft, a pilot for said tool extending from inside said hollow shaft outwardly beyond said tool, and about which pilot said tool is rotated and axially movable, said pilot having means for snugly and removably fitting into said guide to act as a stationary guide for the movements of said tool, means for connecting said pilot to said tool, and means at the opposite end of said pilot from said hollow shaft for producing an upward thrust on said pilot to release said pilot from said guide.

14. A machine according to claim 13 wherein said pilot fitting means includes a frusto-conical section adjacent said releasing means, a split collet around said frusto-conical means, and a means on said releasing means for urging said split collet into engagement with said frusto-conical means.

15. A machine according to claim 14 wherein said pilot includes means for maintaining said collet on said pilot.

16. A machine according to claim 14 wherein said releasing means includes means for retaining said collet.

17. A machine according to claim 13 including a plurality of tools each carrying a pilot and means at the ends of said pilots opposite said tools for simultaneously releasing all of said pilot from said guides.

18. A machine according to claim 13 wherein said pilot includes a fluid duct means with outlets therefrom directed toward said seat.

19. A machine according to claim 18 including means at one end of said pilot for connecting a fluid supply to said duct means.

20. A machine according to claim 19 wherein said connecting means is associated with said releasing means.

References Cited in the file of this patent

UNITED STATES PATENTS

| | | |
|---|---|---|
| 2,010,759 | Hall | Aug. 6, 1935 |
| 2,022,821 | Ostman | Dec. 3, 1935 |
| 2,387,787 | Weynand | Oct. 30, 1945 |
| 2,443,489 | Weynand | June 15, 1948 |
| 2,466,359 | Beverlin | Apr. 5, 1949 |
| 2,525,119 | Dunn | Oct. 10, 1950 |
| 2,611,223 | Emge | Sept. 23, 1952 |
| 2,977,727 | Gray et al. | Apr. 4, 1961 |